United States Patent
Lester et al.

(10) Patent No.: US 7,072,065 B2
(45) Date of Patent: Jul. 4, 2006

(54) VARIABLE CANCEL OF FUTURE PRINT JOBS

(75) Inventors: Samuel M. Lester, Boise, ID (US); Jimmy Sfaelos, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 10/307,655

(22) Filed: Dec. 2, 2002

(65) Prior Publication Data

US 2003/0081238 A1    May 1, 2003

Related U.S. Application Data

(63) Continuation of application No. 09/954,353, filed on Sep. 17, 2001, now Pat. No. 6,958,822.

(51) Int. Cl.
*G06K 15/00* (2006.01)

(52) U.S. Cl. ..................... 358/1.15; 358/1.14

(58) Field of Classification Search ............. 358/1.15, 358/1.14, 437, 442, 1.13, 1.18, 474, 471, 358/443

See application file for complete search history.

(56) References Cited

U.S. PATENT DOCUMENTS

| | | | | |
|---|---|---|---|---|
| 5,241,655 A | * | 8/1993 | Mineki et al. | 715/835 |
| 5,982,994 A | * | 11/1999 | Mori | 395/114 |
| 6,115,044 A | * | 9/2000 | Alimpich et al. | 715/855 |
| 6,139,177 A | | 10/2000 | Venkatraman et al. | |
| 6,480,688 B1 | * | 11/2002 | Yasui | 399/194 |
| 6,667,810 B1 | * | 12/2003 | Jeyachandran et al. | 358/1.14 |
| 2002/0143915 A1 | * | 10/2002 | Mathieson | 709/223 |
| 2003/0081238 A1 | * | 5/2003 | Lester et al. | 358/1.14 |
| 2004/0046982 A1 | * | 3/2004 | Jeyachandran et al. | 358/1.13 |

FOREIGN PATENT DOCUMENTS

| | | | |
|---|---|---|---|
| JP | 08-058158 | | 3/1996 |
| JP | 09124410 | * | 3/1998 |
| JP | 11-143665 | * | 5/1999 |
| JP | 2000-020261 | * | 1/2000 |
| JP | 2000-20261 | | 1/2000 |
| JP | 2002-248841 | * | 9/2002 |

* cited by examiner

*Primary Examiner*—Jerome Grant, II

(57) ABSTRACT

A printer is responsive to user input to cancel print jobs that are received after the user input. The user repeatedly selects a cancel input to indicate how many print jobs to cancel.

3 Claims, 5 Drawing Sheets

VARIABLE CANCEL OF FUTURE PRINT JOBS

RELATED APPLICATIONS

This application is a continuation of and claims priority to U.S. patent application Ser. No. 09/954,353, entitled "Variable Cancel of Future Print Jobs," filed Sep. 17, 2001, by inventors Lester and Sfaelos now U.S. Pat. No. 6,958,822.

TECHNICAL FIELD

The present invention relates to print devices and, more particularly, to methods and systems for canceling print jobs received by a print device.

BACKGROUND

When using a printer with a computer, a situation sometimes arises in which a print job is sent to the printer and it is later desired to recall or cancel the print job. In some cases, the print job can be canceled from the computer. In other cases, it may be too late to cancel the job from the computer, and it may be necessary to interact with the printer in order to cancel the job.

Many printers have a "cancel" button that a user presses to cancel the print job that is currently being processed. The ability to cancel the current print job is effective and sufficient in many situations. However, the simple functionality of a cancel button can be inadequate in other situations.

Specifically, there are situations in which multiple print jobs are mistakenly sent to the printer and a user wishes to cancel many or all of such print jobs. For example, suppose there is a condition that prevents the printer from processing its print jobs—an out-of-paper condition or a network communications problem. In response to a condition such as this, a user's initial attempt to print a document fails, and the user might respond by sending the print job to the printer multiple times before realizing the nature of the problem. Once the problem is fixed, the printer dutifully completes the multiple, duplicate print jobs, even though the user really needed only a single copy of the document. The printer's cancel button can be used to cancel each successive print job, but the user must stand by the printer to press the cancel button as the printer receives or attempts to print each successive print job. In many cases, it is difficult to correctly time this operation, and the printer might print an initial page of each document before the user can cancel it.

As another example, there are times when a user inadvertently sends a binary file or other file that is not formatted appropriately for the printer. Although the printer attempts to interpret the file as a valid print job, the resulting output is usually a sequence of random characters. Furthermore, certain codes encountered by the printer when parsing such binary files are interpreted as "end-of-job" codes, which cause the printer to advance to a new page and begin what it has interpreted as a new job. Thus, the end result of sending a binary file to the printer can be a large number of wasted pages. To avoid this result, the user needs to press the cancel button as each new "job" is encountered. In many cases, the printer is faster than the user, so that the user is unable to press the cancel button fast enough to avoid printing at least one page for each "job". This can result in a lot of wasted paper and time.

SUMMARY

The print devices described herein allow a user to cancel future print jobs by repetitively pressing a cancel input.

DETAILED DESCRIPTION

Figure 1:
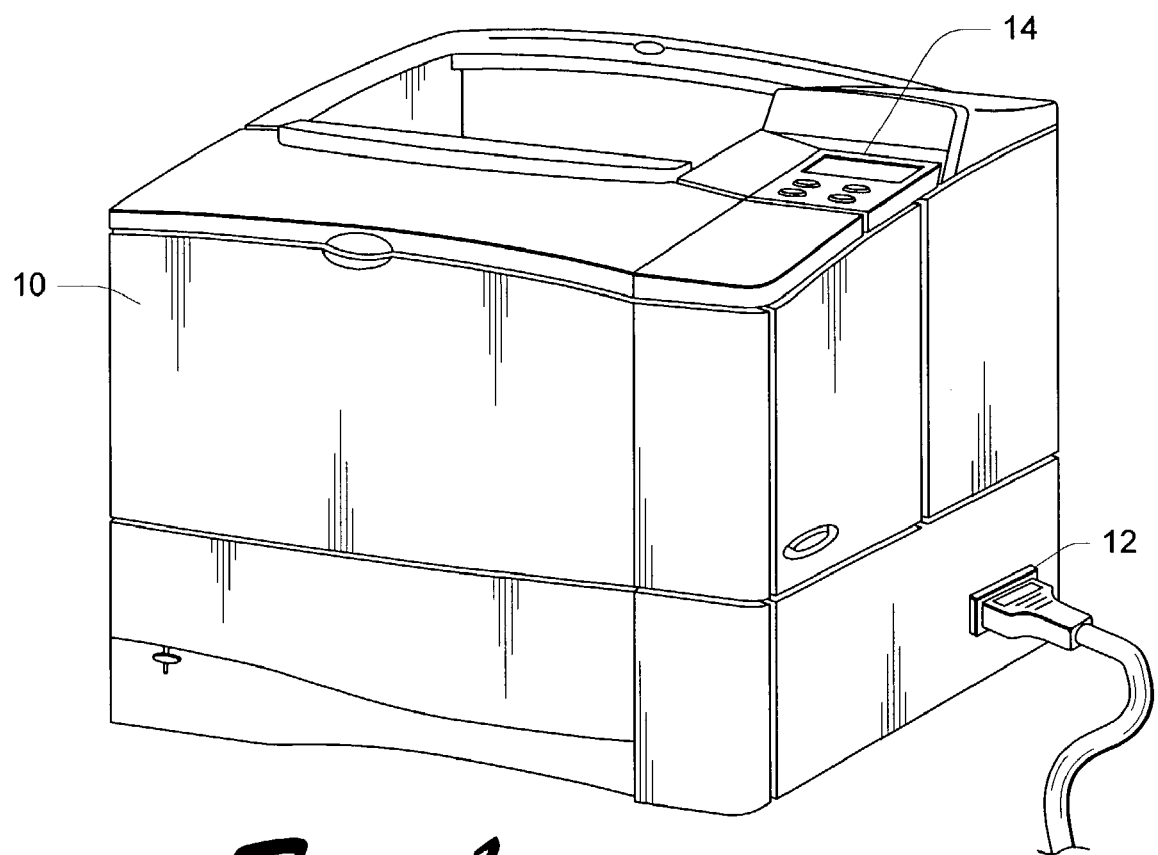
FIG. 1 is a block diagram showing pertinent components of an exemplary print device.

FIG. 1 shows a printer or other print device 10 in accordance with an embodiment of the invention. Examples of print devices include laser-based printers, ink-jet printers, dot-matrix printers, and others. Such print devices can be configured as personal printers associated with individual computers, network-based printers or copiers, so-called multi-function products (MFPs), and other types of devices that produce images based on received data.

Print device 10 has one or more communications ports 12 through which it receives individual print jobs. Each print job typically comprises a data structure or sequence of data values formatted in accordance with a predetermined protocol such as PCL (printer control language), Postscript, PDF (portable document format, defined by Adobe Systems Incorporated), HTML (hyper-text markup language), PJL (printer job language), etc. Each print job is typically terminated with some predetermined data value that acts as an "end-of-job" indicator, and which delineates between successive print jobs.

Communications ports 12 may include parallel or serial input ports, network ports, infrared communications ports, and/or other types of data ports that allow data and print jobs to be provided to printer 10. Print jobs are typically provided to printer 10 by one or more computers or computer-like devices (not shown) through the communications ports 12 of printer 10.

Figure 2:
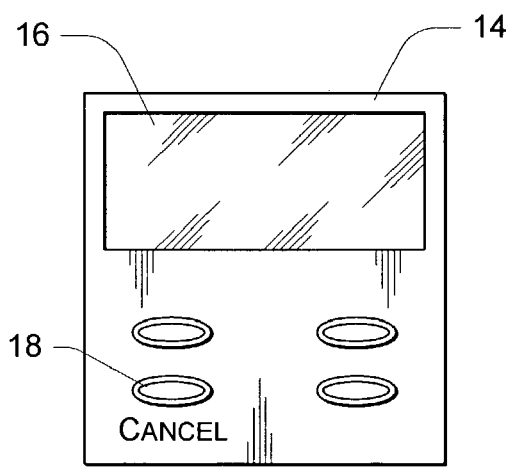
FIG. 2 shows a display panel of the print device shown in FIG. 1.

Print device 10 has a control panel 14, which is shown in more detail in FIG. 2. In this embodiment, control panel 14 comprises a status display 16 and a cancel input or key 18 that can be selected by a user. In many embodiments, the control panel will comprise a variety of different control elements such as additional keys and indicators. Furthermore, the cancel input 18 might be implemented in different ways, such as by way of a menu selection, by a programmable "soft" key, by a displayed control on a touch-sensitive display, etc. Alternatively, it would be possible to implement much of the functionality described below with only a single cancel input key, without any associated indicators, displays, or additional keys.

Figure 3:
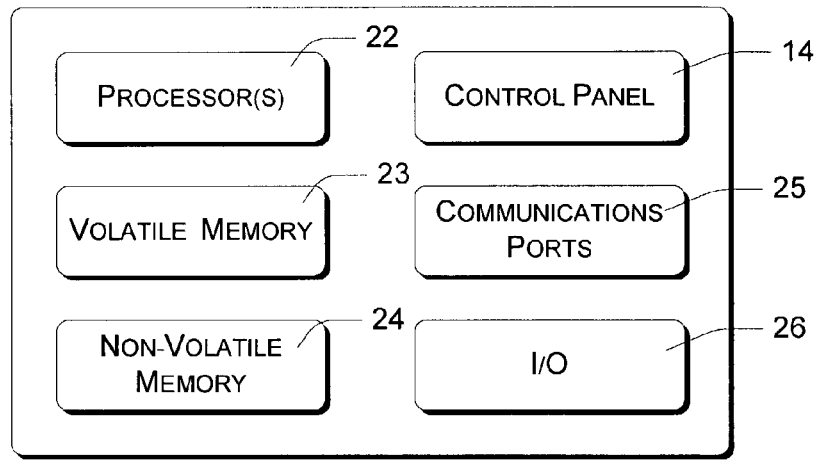
FIG. 3 is a block diagram showing pertinent functional component of the print device of FIG. 1.

FIG. 3 shows pertinent operational components of printer 10, including one or more processors 22, volatile memory 23, non-volatile memory 24, communications components or ports 25, and I/O components 26 that allow processor 22 to control various electromechanical and electro-optical components of printer 10 in order to transform received printing instructions into printed pages. FIG. 3 also shows control panel 14. Processor 22 is configured by way of instructions stored in memory 23 and 24 to perform normal printing operations, and to form means for performing the unique job cancellation logic and functions that will be described in more detail below.

Figure 4:
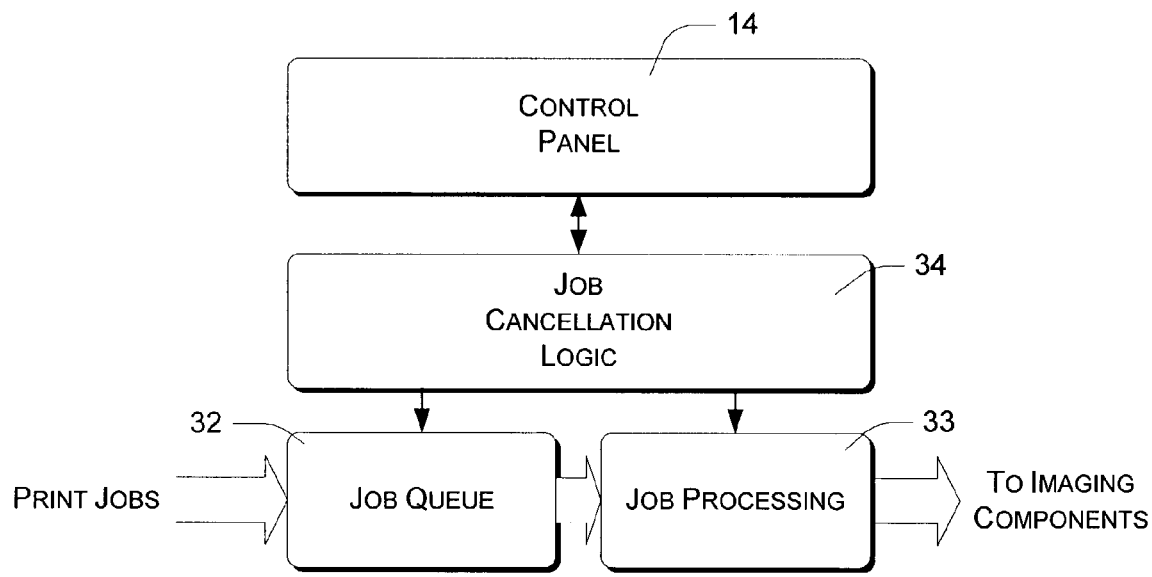
FIG. 4 is a block diagram showing logical components implemented at least in part by the functional components of FIG. 3.

FIG. 4 shows pertinent logical or functional components implemented by the processor-based system illustrated in FIG. 3. Note that while the described functionality is described as being implemented with a programmable processor, associated memory, and program instructions that are retrieved from the memory and executed in sequence by the processor, the functionality might alternatively be implemented with various types of configurable, non-instruction-based components such as ASICs (application-specific integrated circuits), by so-called "hard-wired" logic, or by other existing or yet-to-be-developed technologies.

Pertinent logical components of printer 10 shown in FIG. 4 include a job queue 32, job processing logic 33, and job cancellation logic 34. FIG. 4 also shows control panel 14, through which job cancellation logic 34 receives commands and other input from a user of the printer.

When a print job is received at a communications port 25, it is stored in job queue 32. From there, job processing logic 33 retrieves print jobs on a first-come, first-served basis and takes the necessary steps to print the documents defined by the print jobs.

Job cancellation logic 34 is responsive to cancel input 18 (FIG. 2) to cancel current and future print jobs. More specifically, the job cancellation logic 34 cancels print jobs in accordance with how long the cancel input was selected by the user. Even more specifically, the job cancellation logic cancels all print jobs received prior to and during a cancellation period that increases as a function of how long the cancel input was selected by the user. Jobs are cancelled by removing them from job queue 32 and/or by instructing job processing logic 33 to terminate its processing activities with respect to jobs that are already being processed.

In the embodiment described herein, the user specifies a future cancellation time period by holding down or continuously selecting cancel input 18 (FIG. 2) of control panel 14 (FIG. 2) for a variable time. Initially pressing cancel key 18 (FIG. 2) cancels only the print job currently being processed or received. After the cancel key is held for a predetermined duration, however, job cancellation logic 34 (FIG. 4) cancels all currently in-process, queued, and/or received print jobs and begins calculating a cancellation time period during which future print jobs will be cancelled. The cancellation period is progressively increased as the user continues to depress or select the cancel input. As the user continues to press the cancellation key and as the cancellation time period increases, the increasing cancellation time period is displayed on status display panel 16 (FIG. 2) After the user releases or has no longer selected the cancel input, the job cancellation logic cancels all print jobs that are received or that would have otherwise been initiated during a period of time that is equal to the specified cancellation period. After the user releases the cancel key, any remaining portion of the job cancellation period is displayed on status display panel 16 (FIG. 2) as it counts down. In addition, the number of print jobs that have been cancelled during the cancellation period is displayed on status display panel 16 (FIG. 2). As an example, the display panel might appear as follows while setting a cancellation period or while the cancellation period counts down to zero after releasing the cancel key:

Jobs Cancelled: 5

Cancellation Period: 16 (Seconds)

Preferably, the calculated job cancellation time is greater than the time that the cancel input is selected. For example, the job cancellation period can be calculated so that it is proportional to the time during which the cancel key was selected. More preferably, the cancellation period is increased by successively larger factors or amounts with each successive and continuous unit of time that the cancel key remains selected. For example, pressing the cancel key for one second creates a cancellation period of two seconds; pressing the cancellation key for two seconds creates a cancellation period of four seconds; pressing the cancellation key for three seconds creates a cancellation period of nine seconds; pressing the cancellation key for four seconds creates a cancellation period of sixteen seconds, and so on.

Figure 5:
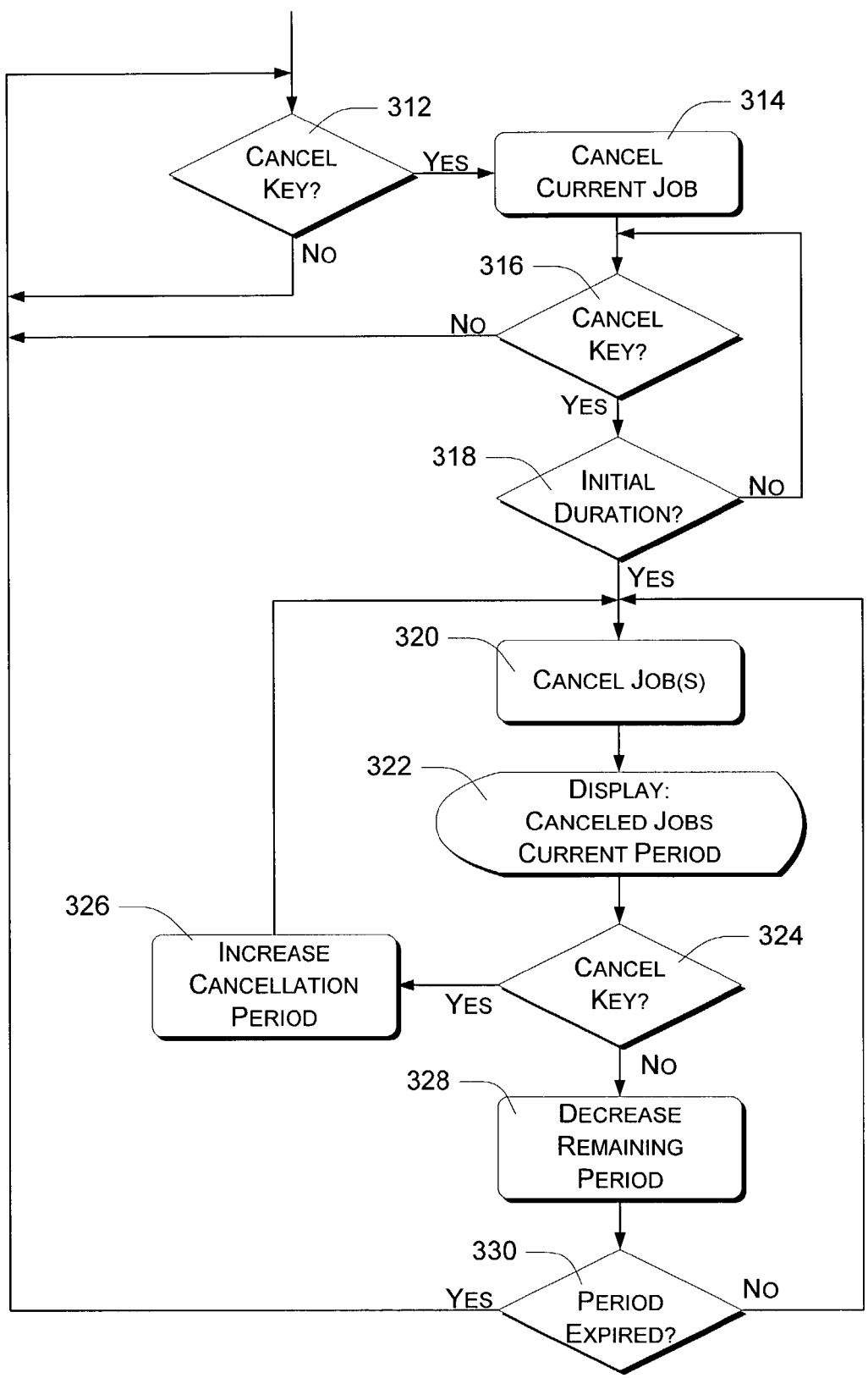
FIG. 5 is a flowchart showing methodological aspects in accordance with a first embodiment of the invention.

FIG. 5 shows methodological aspects implemented by the components discussed above. A decision block 312 comprises monitoring the cancel key or input to detect when it has been activated. If the cancel key is selected or activated, execution goes to block 314, which comprises canceling the current print job. Subsequent blocks 316 and 318 comprise determining whether the cancel key remains selected for a predetermined threshold duration, such as one second. If the cancel key is released before the threshold duration, execution reverts to block 312 to await another activation of the cancel key. If the cancel key remains selected for the threshold duration, however, the process initiates a job cancellation period.

In response to selecting the cancel input for the threshold duration, execution begins at block 320, which comprises canceling all current print jobs. This includes all jobs currently being received, all jobs currently being printed, and all jobs that are in the job queue. In addition, display block 322 comprises displaying, on the status display, the number of print jobs that have been cancelled up to this point and the current value of the cancellation period.

Subsequent to block 322, the process is responsive to further selection of the cancel key to increase the job cancellation period as a function of the time that the cancel input is selected. More specifically, a decision block 324 comprises again monitoring the cancel input to detect whether it remains selected. If it does, execution proceeds with block 326, which comprises increasing the cancellation period in accordance with the duration of time that the cancel key has been continuously selected. Execution then returns to blocks 320 and 322, which comprise canceling any newly received jobs and displaying the updated number of jobs that have been canceled and the current value of the cancellation period.

If the cancel key is no longer selected in block 324, execution goes to block 328 which comprises decreasing the remaining cancellation period in accordance with the elapsed time since the cancel key was released. If the remaining cancellation period has decreased to zero in block 330, execution returns to block 312 to await another selection of the cancel key. If there is still remaining time in the cancellation period, however, execution goes from block 330 to blocks 320 and 322, in which any newly received jobs or other in-process jobs are cancelled and the display is updated to reflect the number of jobs that have been canceled and the current or remaining value of the cancellation period.

In an alternative embodiment, current and future print jobs are cancelled by specifying a job cancellation count rather than a job cancellation time period. Such a count is specified by continuously selecting the cancel key for a variable time: the job cancellation logic is responsive to the cancel input to cancel a number of print jobs that increases as a function of the time the cancel input is selected. The count increases linearly as the cancel input is continuously selected. Alternatively, the count can be made to increase progressively faster as the cancel input is selected for longer and longer periods.

In this embodiment, display panel 16 (FIGS. 1 and 2) is updated to display the job cancellation count as it is increased in response to selecting the cancel input, and as it decreases or counts down when jobs are cancelled. In addition, the total number of jobs that have been cancelled is displayed.

Jobs Cancelled: 5
Remaining Jobs to Cancel: 10

In this embodiment, setting a job cancellation count can result in canceling both currently queued or in-process print jobs and print jobs that have not yet been received by the printer. Jobs are cancelled in the order that they are or were received—jobs received first are canceled first.

Although holding down the cancel key is disclosed as a preferred technique for indicating a cancellation period or cancellation count, other input methods might be used to indicate a measure of present and/or future print jobs to be cancelled. For example, repeatedly pressing the cancel key or otherwise selecting some type of control might be used to indicate a cancellation period or cancellation count, where each successive press or selection increments the period or count by a predetermined amount or by an amount that increases with each successive press or selection.

Figure 6:
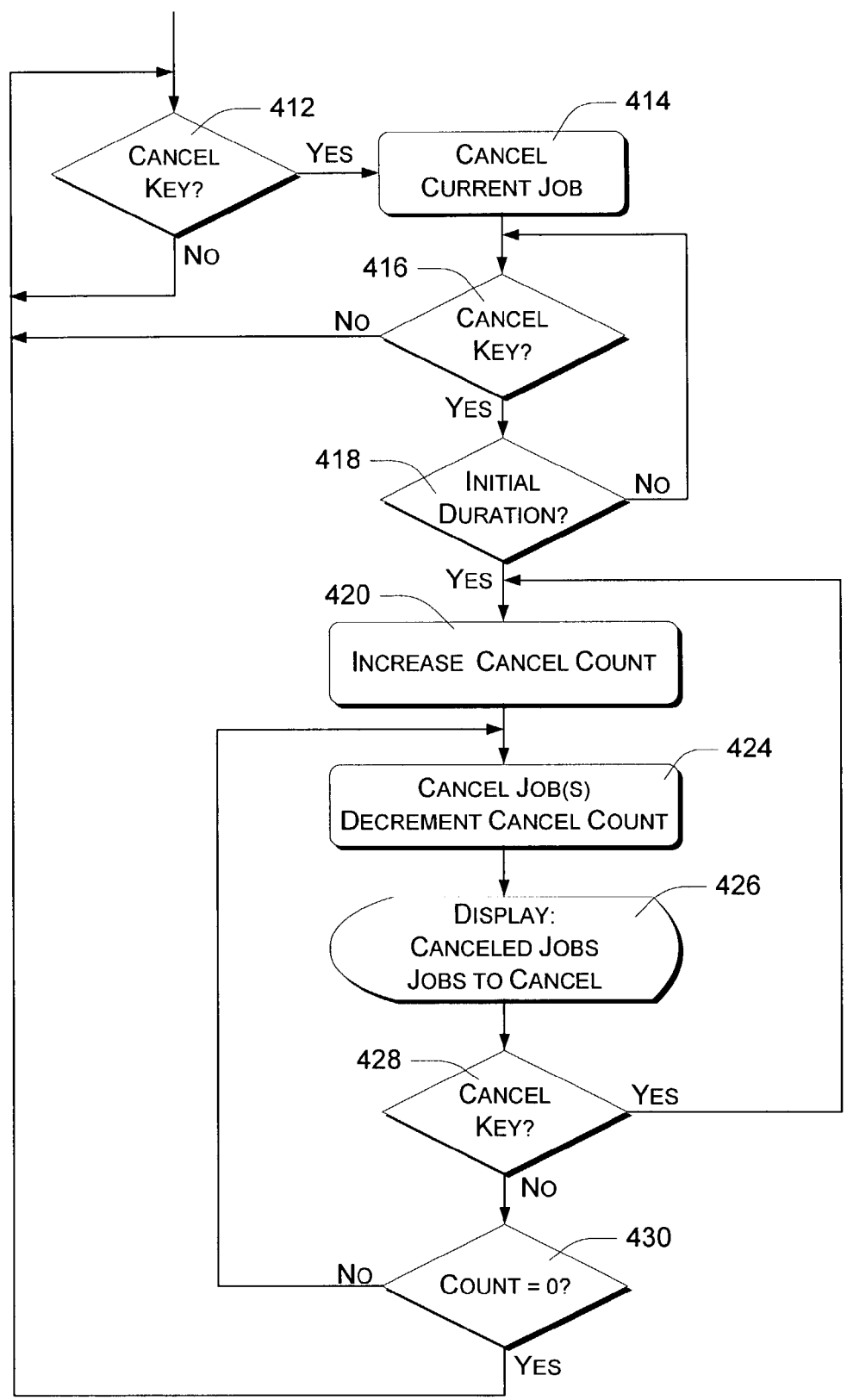
FIG. 6 is a flowchart showing methodological aspects in accordance with a second embodiment of the invention.

FIG. 6 shows methodological aspects employed in this embodiment of the invention. A decision block 412 comprises monitoring the cancel key or input to detect when it has been activated. If the cancel key is selected or activated, execution goes to block 414, which comprises canceling the current print job. Subsequent blocks 416 and 418 comprise determining whether the cancel key remains selected for a predetermined threshold duration, such as one second. If the cancel key is released before the threshold duration, execution reverts to block 412 to await another activation of the cancel key. If the cancel key remains selected for the threshold duration, however, execution flows to block 420, which comprises increasing the job cancellation count in accordance with the duration that the cancel input has been selected. Block 424 is executed next, comprising canceling any currently queued or in-process print jobs, up to the number of the current job cancellation count. In addition, the job cancellation count is decremented once for every print job that is canceled.

A subsequent display block 426 comprises displaying, on the status display, the number of print jobs that have been cancelled up to this point and the current job cancellation count.

Subsequent to block 426, the process is responsive to further selection of the cancel key to increase the job cancellation count as a function of the time that the cancel input is selected. More specifically, a decision block 428 comprises again monitoring the cancel input to detect whether it remains selected. If it does, execution returns to block 420, which comprises increasing the cancellation period in accordance with the duration of time that the cancel key has been continuously selected, and to subsequent blocks 424 and 426. If the cancel key is no longer selected in block 428, execution goes to block 430. If the job cancellation count has decreased to zero at block 430, execution returns to block 412 to await another selection of the cancel key. If there are remaining jobs to be cancelled (the job cancellation count is greater than zero), however, execution loops from block 430 to blocks 424 and 426, which continue to cancel print jobs and update the display.

In yet another embodiment, a job cancellation count can be specified by repeatedly selecting the cancel key. In this embodiment, the job cancellation logic is responsive to the cancel input to increase or increment the number of print jobs to be canceled as a function of how many times the cancel input is selected. The count increases by one with each selection of the cancel input. More generally, the count increases by a pre-defined number with each selection of the cancel input. Alternatively, the count can be made to increase by progressively larger amounts with each subsequent selection of the cancel input.

In this embodiment, display panel 16 (FIGS. 1 and 2) is updated to display the job cancellation count as it is increased in response to selecting the cancel input, and as it decreases or counts down when jobs are cancelled. In addition, the total number of jobs that have been cancelled is displayed. For example:

Alternatively, the display panel might be configured to display the two values shown above and a third value indicating the total number of jobs to be canceled:

Total Jobs to Cancel: 15
Jobs Already Cancelled: 5
Future Jobs to Cancel: 10

Setting a job cancellation count can result in canceling both currently queued or in-process print jobs. The number of print jobs to be canceled also potentially includes future print jobs that have not yet been received and/or queued by the printer. Jobs are cancelled in the order that they are or were received—jobs received first are canceled first.

Figure 7:
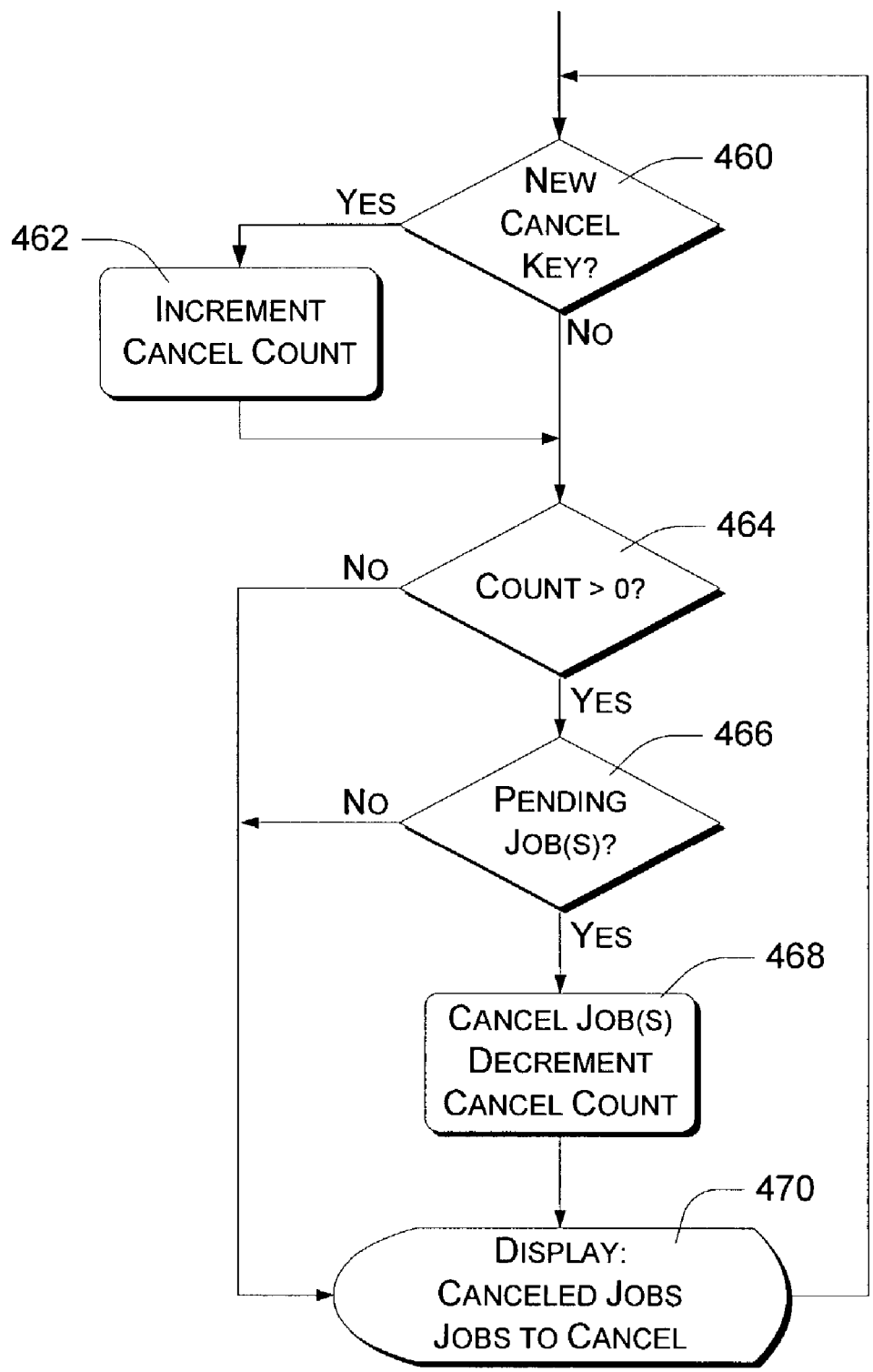
FIG. 7 is a flowchart showing methodological aspects in accordance with a third embodiment of the invention.

FIG. 7 shows methodological aspects employed in this embodiment. A decision block 460 comprises monitoring the cancel key or input to detect when it has been activated. In this embodiment, this comprises detecting each new selection of the cancel input, rather than detecting when the input remains depressed. In other words, decision block 460 evaluates as true or "yes" only once for each selection or depression of the cancel key.

If the cancel key has been selected or activated, execution goes to block 462, which comprises incrementing a job cancellation count. After block 462, or if the result of decision 460 is "no", execution goes to block 464.

Action 464 comprises determining whether the job cancellation count is greater than zero. If it is not, no print jobs are to be canceled and execution continues with block 470, which comprises displaying relevant information about how many jobs have been canceled.

If the job cancellation count is greater than zero, a decision 466 comprises determining if there are any pending, in-process, or newly-received print jobs. If there are not, execution continues with block 470. If there are one or more pending, in-process, or newly-received print jobs, an action 468 is performed of canceling the "oldest" one of the print jobs (the one that was received first), and decrementing the job cancellation count. Execution then continues with display action 470.

The actions of FIG. 7 are performed repetitively to monitor the cancel key and to cancel print jobs as appropriate.

Although FIGS. 5–7 indicate specific methodological implementations, it should be recognized that there are many different ways of implementing the described features and of allowing a user to set a job cancellation period or to set a number of jobs that are to be cancelled.

The techniques described above allow a user to recover more easily when numerous print jobs arc mistakenly sent to and queued at a printer, or in any other situation in which the user simply wishes to cancel multiple transmitted or queued print jobs. The described solutions are quite easy to implement within a printer. Furthermore, the solutions are easy for a user to understand and use.

For example, suppose that a user mistakenly sends a binary file that the printer interprets as multiple separate print jobs. To recover from this situation in conjunction with the first embodiment described above, the user can simply press the cancel key to program a job cancellation period of thirty seconds. Any of the mistaken "jobs" received during this period will be canceled. Furthermore, because the printer has been instructed to cancel future print jobs, such jobs are canceled before they begin. This eliminates the wasted pages that often result in prior art system when the user is unable to correctly time his or her activation of the cancel key.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A print device that receives multiple print jobs, comprising:
    a cancel input that is selectable by a user; and
    job cancellation logic that is responsive to the cancel input to cancel a number of print jobs that potentially include future print jobs, wherein the number of print jobs to be canceled is a function of how many times the cancel input is selected; and
    a status display that indicates the number of print jobs that have been canceled and the number of print jobs yet to be canceled.

2. In a print device that receives multiple print jobs, a method comprising:
    determining a number of print jobs to be canceled in response to user selection of a cancel input, wherein the number of print jobs potentially include future print jobs;
    increasing the number of print jobs to be canceled as a function of how many times the cancel input is selected;
    canceling the determined number of print jobs;
    displaying the number of print jobs yet to be canceled; and
    displaying the number of print jobs that have been canceled.

3. A print device that receives multiple print jobs, comprising:
    means for determining a number of print jobs tote canceled in response to user selection of a cancel input, wherein the number of print jobs potentially include future print jobs;
    means for increasing the number of print jobs to be canceled as a function of how many times the cancel input is selected;
    means for canceling the determined number of print jobs;
    means for displaying the number of print jobs yet to be canceled; and
    means for displaying the number of print jobs that have been canceled.

* * * * *

UNITED STATES PATENT AND TRADEMARK OFFICE
CERTIFICATE OF CORRECTION

PATENT NO.        : 7,072,065 B2                                            Page 1 of 1
APPLICATION NO. : 10/307655
DATED             : July 4, 2006
INVENTOR(S)       : Samuel M. Lester et al.

It is certified that error appears in the above-identified patent and that said Letters Patent is hereby corrected as shown below:

In column 7, line 4, delete "arc" and insert -- are --, therefor.

In column 8, line 22, in Claim 3, delete "tote" and insert -- to be --, therefor.

Signed and Sealed this

Third Day of March, 2009

JOHN DOLL
*Acting Director of the United States Patent and Trademark Office*